United States Patent
Conley et al.

(10) Patent No.: US 10,589,663 B2
(45) Date of Patent: Mar. 17, 2020

(54) METHOD AND APPARATUS FOR EXTERIOR REAR LAMP ALIGNMENT

(71) Applicant: FORD GLOBAL TECHNOLOGIES, LLC, Dearborn, MI (US)

(72) Inventors: Jody Conley, New Boston, MI (US); Gary Edward Henige, Northville, MI (US); Manpreet Bansal, Brampton (CA); Martin D. Lopez, Jr., Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 15/695,171

(22) Filed: Sep. 5, 2017

(65) Prior Publication Data
US 2019/0071000 A1    Mar. 7, 2019

(51) Int. Cl.
*B60Q 1/26* (2006.01)
*B60Q 1/00* (2006.01)
*B60Q 1/30* (2006.01)
*B62D 65/02* (2006.01)
*B62D 65/16* (2006.01)

(52) U.S. Cl.
CPC ......... *B60Q 1/2642* (2013.01); *B60Q 1/0041* (2013.01); *B60Q 1/2626* (2013.01); *B60Q 1/2638* (2013.01); *B60Q 1/30* (2013.01); *B62D 65/024* (2013.01); *B62D 65/16* (2013.01)

(58) Field of Classification Search
CPC .. B60Q 1/2607; B60Q 1/2619; B60Q 1/2623; B60Q 1/2626; B60Q 1/263; B60Q 1/2638; B60Q 1/2642; B60Q 1/30; B60Q 1/0041; B62D 65/024; B62D 65/16
See application file for complete search history.

(56) References Cited

U.S. PATENT DOCUMENTS

| | | | |
|---|---|---|---|
| 4,532,577 A | 7/1985 | Shelton | |
| 9,328,891 B1* | 5/2016 | Dernar | B60Q 1/2607 |
| 10,173,576 B2* | 1/2019 | Happy | B60Q 1/0035 |
| 10,240,747 B2* | 3/2019 | Happy | F21S 43/245 |
| 2008/0225542 A1 | 9/2008 | Mertens et al. | |
| 2016/0207446 A1 | 7/2016 | Kumegawa | |
| 2016/0208995 A1 | 7/2016 | Yoshino | |

FOREIGN PATENT DOCUMENTS

JP    2012123977    6/2012

* cited by examiner

*Primary Examiner* — Suezu Ellis
(74) *Attorney, Agent, or Firm* — David Coppiellie; Carlson, Gaskey & Olds, P.C.

(57) ABSTRACT

An apparatus, according to one example includes, among other things, a first panel with a first alignment feature, a first lamp installed on the first panel, a second panel adjacent the first panel and including a second alignment feature, and a second lamp installed on the second panel. A lift system moves the first and second lamps to respectively engage the first and second alignment features and align the first and second lamps. A method according to one example includes, among other things, a step of aligning the first and second lamps with each other by independently moving the first and second lamps to respectively engage the first and second alignment features.

20 Claims, 8 Drawing Sheets

METHOD AND APPARATUS FOR EXTERIOR REAR LAMP ALIGNMENT

TECHNICAL FIELD

This disclosure relates to an exemplary apparatus and method of providing an alignment strategy for exterior rear lamps.

BACKGROUND

Some vehicles include exterior lamps that are in multiple locations on a rear end of the vehicle. For example, a vehicle may include rear body side lamps and a lift gate or trunk lamp. The rear body side lamps are incorporated into a vehicle body structure while the lift or trunk gate lamps are incorporated into body member that is moveable relative to the vehicle body structure between open and closed positions. Due to vehicle build variations, when a lift gate is closed, a top of the lift gate lamp may not be aligned with a top of the body side lamp that is immediately adjacent to the lift gate lamp. This potential issue is caused by having to locate and attach the lift gate lamps to inner vehicle components that have dimensional variation with no way to locate relative to a body side panel structure.

Further, consistent top margin transitioning from the lift gate lamp to the body side lamp can also be difficult to accomplish. When the lift gate and body side lamps are viewed from the rear, the margin sometimes appears to be larger on the lift gate than the body side or vice-versa. This is caused by different locating strategies that are used for each lamp installed on the same vehicle. One lamp may be located relative to inner components or vehicle structures that are susceptible for more dimensional variation, while the other lamp may be located relative to the outer panels which are more dimensionally controlled.

SUMMARY

An apparatus according to an exemplary aspect of the present disclosure includes, among other things, a first panel with a first alignment feature, a first lamp installed on the first panel, a second panel adjacent the first panel and including a second alignment feature, and a second lamp installed on the second panel. A lift system moves the first and second lamps to respectively engage the first and second alignment features and align the first and second lamps.

In a further non-limiting embodiment of the foregoing apparatus, the second panel is moveable relative to the first panel.

In a further non-limiting embodiment of either of the foregoing apparatus, the first panel comprises a vehicle body side panel and the second panel comprises a lift gate or trunk.

In a further non-limiting embodiment of any of the foregoing apparatus, the lift system moves the first lamp independently of the second lamp.

In a further non-limiting embodiment of any of the foregoing apparatus, the first alignment feature comprises a first return flange formed at an upper edge of a first opening in the first panel, and wherein the second alignment feature comprises a second return flange formed at an upper edge of a second opening in the second panel, and wherein the first lamp includes at least one first net pad that engages the first return flange and the second lamp includes at least one second net pad that engages the second return flange such that the first and second lamps have top edges that are aligned with each other.

In a further non-limiting embodiment of any of the foregoing apparatus, the lift system includes a first lift mechanism to move the first lamp upwardly and a second lift mechanism to move the second lamp upwardly independently of the first lamp.

In a further non-limiting embodiment of any of the foregoing apparatus, the first lift system includes at least one rotatable member that is rotated to lift the first lamp into engagement with the first alignment feature and the second lift system includes at least one resilient member that biases the second lamp into engagement with the second alignment feature.

An apparatus according to another exemplary aspect of the present disclosure includes, among other things, a fixed body panel with a first return flange, a moveably body panel adjacent the fixed body panel and including a second return flange, and first and second lamps respectively attached to the fixed and moveable body panels. A lift system independently moves the first and second lamps upwardly to respectively engage the first and second return flanges and align the lamps with each other.

In a further non-limiting embodiment of any of the foregoing apparatus, the fixed body panel comprises a vehicle body side panel and the moveable body panel comprises a lift gate or trunk.

In a further non-limiting embodiment of any of the foregoing apparatus, the lift system includes at least one rotatable member that is rotated to lift the first lamp into engagement with the first return flange and at least one resilient member that biases the second lamp into engagement with the second return flange.

In a further non-limiting embodiment of any of the foregoing apparatus, the at least one rotatable member includes a first fastener that is rotated to adjust a vertical position of the first lamp and a second fastener that is tightened to fix the first lamp to the fixed body panel once the first lamp is in engagement with the first return flange, and wherein the at least one resilient member comprises at least one spring clip that is biased to adjust a vertical position of the second lamp.

A method according to another exemplary aspect of the present disclosure includes the steps of, among other things: installing a first lamp on a body side panel having a first alignment feature; installing a second lamp on a second panel moveable relative to the body side panel and including a second alignment feature; and aligning the first and second lamps with each other by independently moving the first and second lamps to respectively engage the first and second alignment features.

In a further non-limiting embodiment of the foregoing method, the method includes providing a first set of locators on the body side panel, installing the first lamp on the first set of locators, and adjusting a vertical position of the first lamp by lifting the first lamp into engagement with the first alignment feature.

In a further non-limiting embodiment of either of the foregoing methods, the method includes providing a second set of locators on the second panel, installing the second lamp on the second set of locators, and adjusting a vertical position of the second lamp by lifting the second lamp into engagement with the second alignment feature.

In a further non-limiting embodiment of any of the foregoing methods, the method includes independently fastening the first lamp to the body side panel and the second lamp to the second panel subsequent to the adjusting the vertical positions of the first and second lamps.

In a further non-limiting embodiment of any of the foregoing methods, the second alignment feature comprises a second return flange, and the method includes adjusting a vertical position of the second lamp by providing at least one resilient biasing member on a lower edge of the second lamp to bias the second lamp in vertically upward direction to set a vertical margin.

In a further non-limiting embodiment of any of the foregoing methods, the method includes fastening the second lamp to the body side panel to set horizontal and longitudinal margins subsequent to setting the vertical margin.

In a further non-limiting embodiment of any of the foregoing methods, the first alignment feature comprises a first return flange, and the method includes adjusting a vertical position of the first lamp by rotating at least one rotatable member on the first lamp to raise the first lamp upwardly to set a vertical margin.

In a further non-limiting embodiment of any of the foregoing methods, the method includes fastening the first lamp to the second panel to set horizontal and longitudinal margins subsequent to setting the vertical margin.

In a further non-limiting embodiment of any of the foregoing methods, the first alignment feature comprises a first return flange formed at an upper edge of a first opening in the body side panel, and wherein the second alignment feature comprises a second return flange formed at an upper edge of a second opening in the second panel, and the method includes providing the first lamp with at least one first net pad and the second lamp with at least one second net pad, raising the first lamp such that the first net pad engages the first return flange, and raising the second lamp such that the second net pad engages the second return flange resulting in first and second lamps that have upper edges that are aligned with each other.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary apparatus and methods of providing an alignment strategy for exterior rear lamps on a vehicle, and in one example provides an alignment strategy to align a body side lamp with a lamp on a lift gate or trunk.

Figure 1:
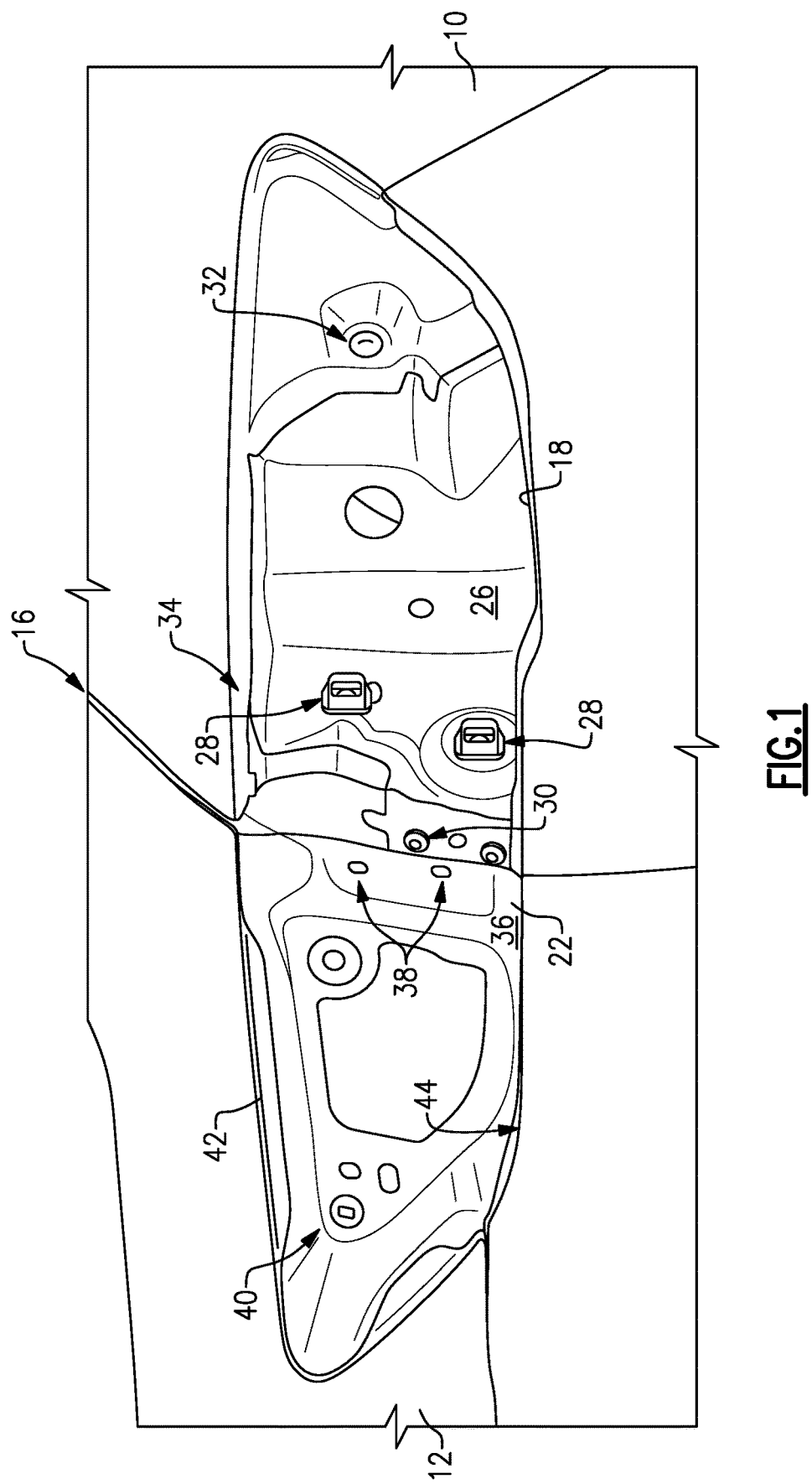
FIG. 1 illustrates a rear view of a lift gate panel and a body side panel incorporating the subject invention.
Figure 2:
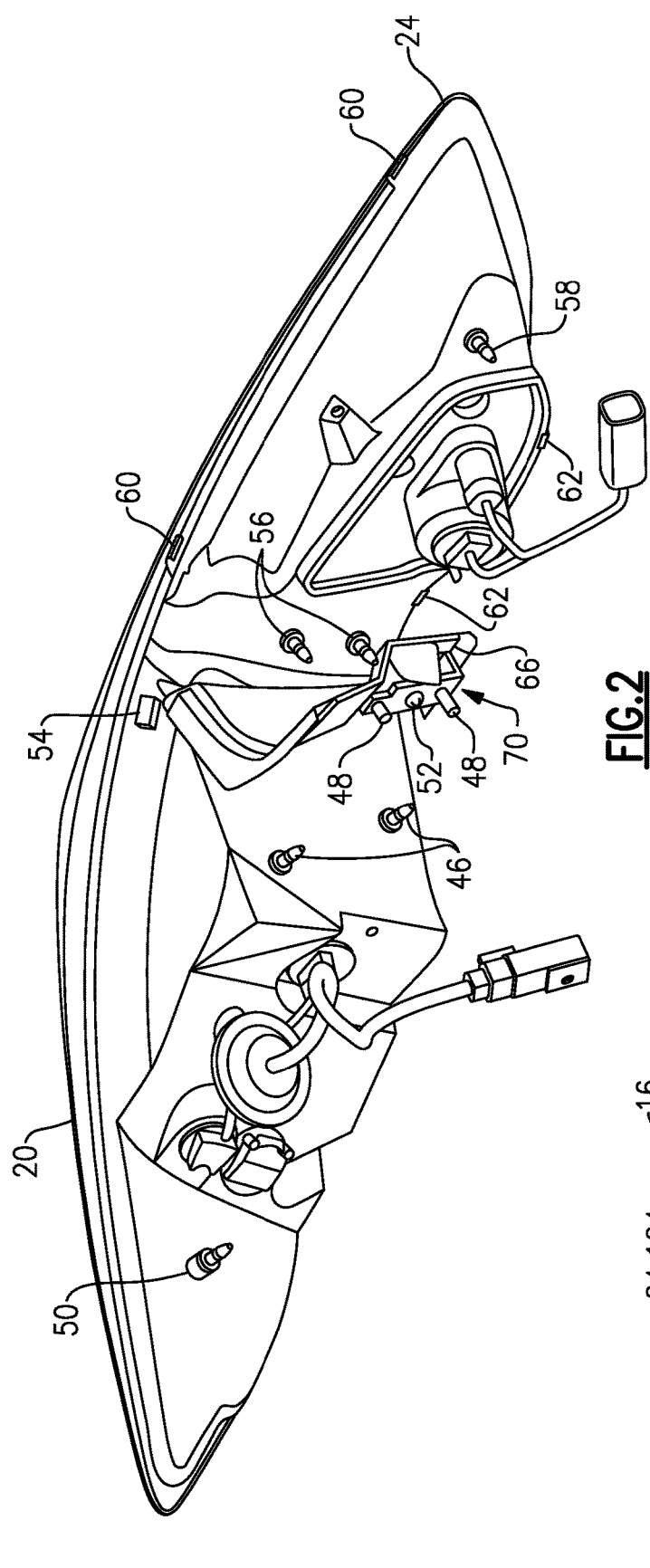
FIG. 2 illustrates an interior view of a lift gate lamp and a body side lamp to be attached to the respective panels of FIG. 1.
Figure 6:
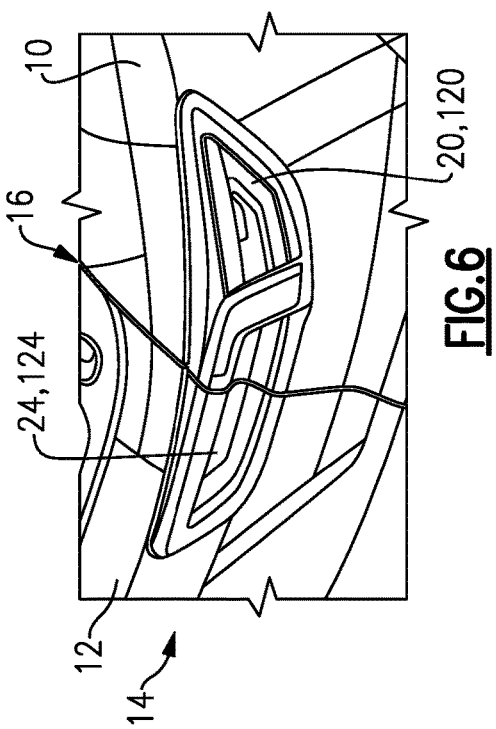
FIG. 6 is a perspective view of a rear end of a vehicle showing a top of a body side lamp aligned with a top of a lift gate lamp.

As shown in FIG. 1, a body side panel 10 is positioned immediately adjacent a trunk or lift gate panel 12 at a rear of a vehicle 14 (FIG. 6). The body side panel 10 and the lift gate panel 12 are separated from each other by a small gap 16 such that the lift gate panel 12 can move relative to the body side panel 10 between open and closed positions. The body side panel 10 includes a first opening 18 that receives a body side lamp 20 (FIG. 2) and the lift gate panel 12 includes a second opening 22 that receives a lift gate lamp 24 (FIG. 2). In one example, the body side 10 and lift gate 12 panels are formed from sheet metal with the respective openings 18, 22 being stamped or cut into the sheet metal.

The subject invention provides a method and apparatus that can be used to align upper or top edges of the lift gate 24 and body side 20 lamps with each other as shown in FIG. 6. The subject invention utilizes a lift system that can independently adjust a position of each of the lamps 20, 24 to provide a z-control (up/down car-height direction or vertical control) such that the lamps are consistently aligned with each other even when there are dimensional variances. The subject lift system will be discussed in greater detail below.

As shown in FIG. 1, a first rigid sheet metal attachment structure 26 is positioned at least partially in the first opening 18 of the body side panel 10 and includes a plurality of alignment features that cooperate with corresponding features on the body side lamp 20. The first attachment structure 26 comprises an inner panel structure while the body side panel 10 comprises an outer panel structure. In one example, the first attachment structure 26 includes one or more floating grommets 28 that provide y-control (cross-car direction or horizontal control) and one or more cylindrical grommets 30 for permanent securement to provide x-control (fore/aft car-length direction or longitudinal control). There is also at least one cylindrical grommet 32 that provides six-way control, i.e. x-control, y-control, and z-control. At an upper edge of the first opening 18 is a body side return flange 34 formed in the outer sheet metal panel. This body side return flange 34 provides the z-control.

A second rigid sheet metal attachment structure 36 is positioned at least partially in the second opening 22 of the lift gate panel 12 and includes a plurality of alignment features that cooperate with corresponding features on the lift gate lamp 24. The second attachment structure 36 comprises an inner panel structure while the lift gate panel 112 comprises an outer panel structure. In one example, the second attachment structure 36 includes one or more vertically extending slots 38 or stamped holes that provide x-control and y-control. There is also one or more slotted grommets 40 with vertically extending slots that provide x-control and y-control. At an upper edge of the second opening 22 is an upper lift gate return flange 42 formed in the outer sheet metal panel. At a lower edge of the second opening 22 is a lower lift gate return flange 42. The upper 42 and lower 44 lift gate return flanges provide the z-control.

FIG. 2 shows an interior view of the body side 20 and lift gate 24 lamps with alignment features that cooperate with those of the body side panel 10 and lift gate panel 12 as shown in FIG. 1. The body side lamp 20 includes one or more cylindrical garyballs 46 that provide y-control and one or more cylindrical fasteners 48, such as screws for example, that are for permanent securement to provide x-control. There is also at least one cylindrical garyball 50 that provides six-way control, i.e. x-control, y-control, and z-control. A lift system 52 cooperates with the fasteners 48 to adjust the vertical position of the body side lamp 20 to set a z-margin. At an upper edge of the body side lamp 20 is one or more net pads 54 that cooperate with the body side return flange 34 to set the z-margin and provide the z-control.

The lift gate lamp 24 includes one or more cylindrical threaded fasteners 56, such as threaded studs for example, that provide permanent attachment as well as x-control and y-control. There is also one or more garyballs 58 that provide x-control and y-control. At an upper edge of the lift gate lamp 24 is one or more net pads 60 that cooperate with the upper lift gate return flange 42 to set the z-margin and provide the z-control. A lift system 62 cooperates with the lower lift gate return flange 42 to provide z-control.

Figure 3:
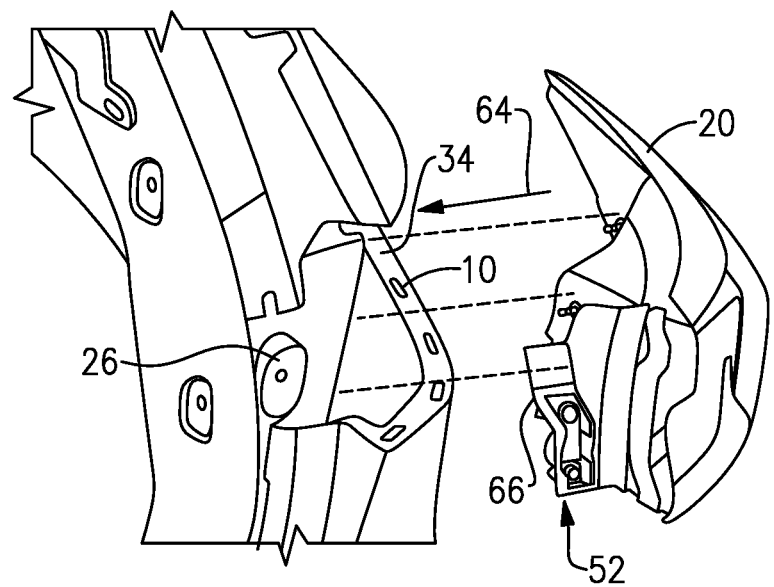
FIG. 3 is an installation view of the body side lamp being installed onto the body side panel.
Figure 4:
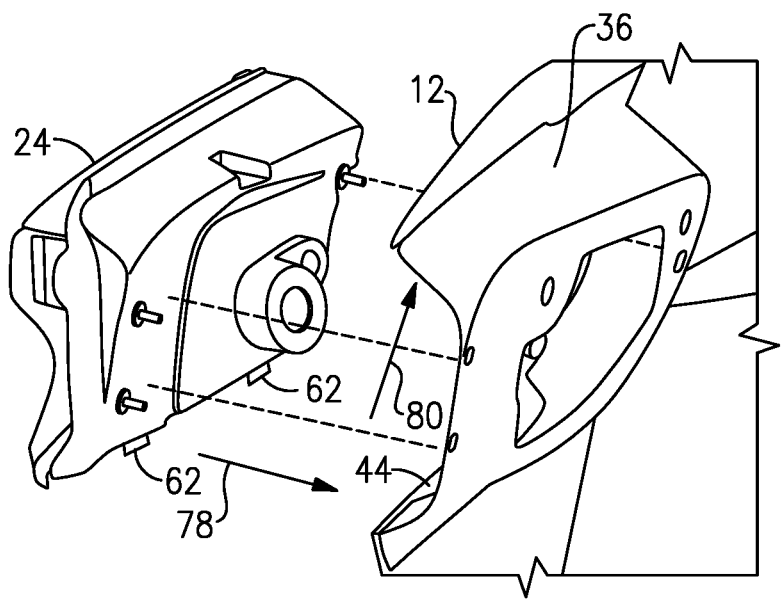
FIG. 4 is an installation view of the lift gate lamp being installed onto the lift gate panel.

FIG. 3 shows how the body side lamp 20 is secured to the body side panel 10 and FIG. 4 shows how the lift gate lamp 24 is secured to the lift gate panel 12. As shown in FIG. 3, the first step (indicated by arrow 64) includes installing the body side lamp 20 onto alignment and attachment features of the body side panel 10. For example, two cylindrical garyballs 46 are installed onto two floating grommets 28 and one cylindrical garyball 50 is installed onto one cylindrical grommet 32. The cylindrical fasteners 48 cooperate with the lift system 52 and two cylindrical grommets 30 to set the z-margin and then permanently secure the body side lamp 20 in place.

Figure 5A:
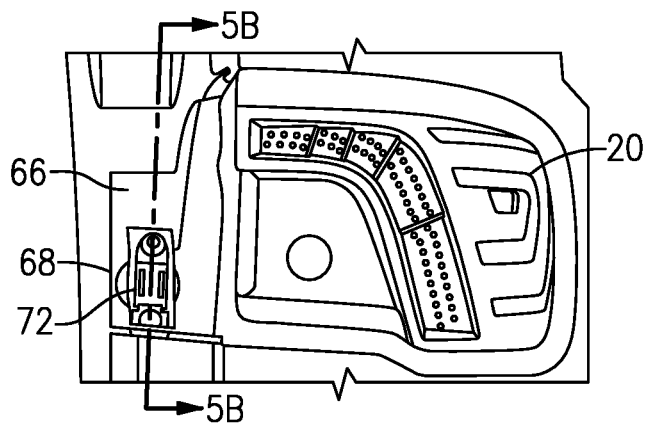
FIG. 5A is an end view from a rear of the vehicle showing the body side lamp and lift system.
Figure 5B:
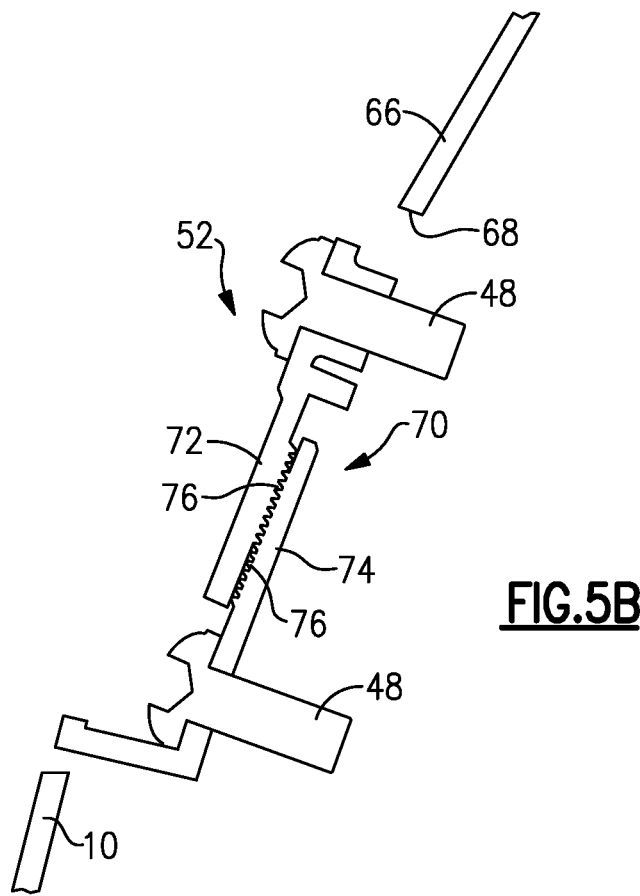
FIG. 5B is a section view of the lift system as identified in FIG. 5A.

One example of the lift system 52 is shown in FIGS. 5A-5B. The lift system 52 includes a bracket body 66 that is mounted to the lift gate lamp 24. The bracket body 66 includes an opening 68 within which a lifting mechanism 70 is positioned. The lifting mechanism 70 includes a first ratchet member 72 that receives the upper fastener 48. A second ratchet member 74 is formed as part of the bracket body 66 and extends into the opening 68 to mate with the first ratchet member 72. The second ratchet member 74 receives the lower fastener 48. The first 72 and second 74 ratchet members have ratcheting serrated teeth 76 that engage each other.

Once the body side lamp 20 is installed on the body side panel 20, the upper fastener 48 is rotated which causes the first ratchet member 72 to move upwardly relative to the second ratchet member 74 tooth-by-tooth 76 until the net pads 54 of the body side lamp 20 engage or net out on the metal return flange 34 of the body side panel 10. When the pads 54 net out on the return flange 34 the z-margin is set and no further vertical adjustment of the body side lamp 20 is required. After the upper fastener 48 is secured, the installer torques down the bottom fastener 48 to set the x-margin and the y-margin. The body side lamp 20 is then finally installed and secured to the body side panel 10.

As shown in FIG. 4, a first step (indicated by arrow 78) includes installing the lift gate lamp 24 onto alignment and attachment features of the lift gate panel 12. For example, two threaded fasteners 56 are installed into two vertical slots 38 and one garyball 58 is installed into the vertical slotted grommet 40. During step one 78, the lift system 62 pushes the lift gate lamp 24 upwardly and the net pads 60 at the top of the lamp 24 net out on the upper return flange 42 to set the z-margin. In one example, the lift system 62 comprises one or more spring clips that react between the lower return flange 44 and a bottom of the lift gate lamp 24 to push the lamp 24 upwardly as indicated by arrow 80. It should be understood, that spring clips are just one example of a lifting system, and that other resilient biasing members or other types of lifting members can be used to raise the lamp 24 to engage the return flange.

Once the lift gate lamp 24 is in the correct vertical position, the threaded fasteners 56 are torqued down to set the x-margin and the y-margin. Once this occurs, the lift gate lamp 24 is fully installed and is aligned with the body side lamp 20. As shown in FIG. 6, the top edges of both lamps 20, 24 are aligned with each other.

Figure 7:
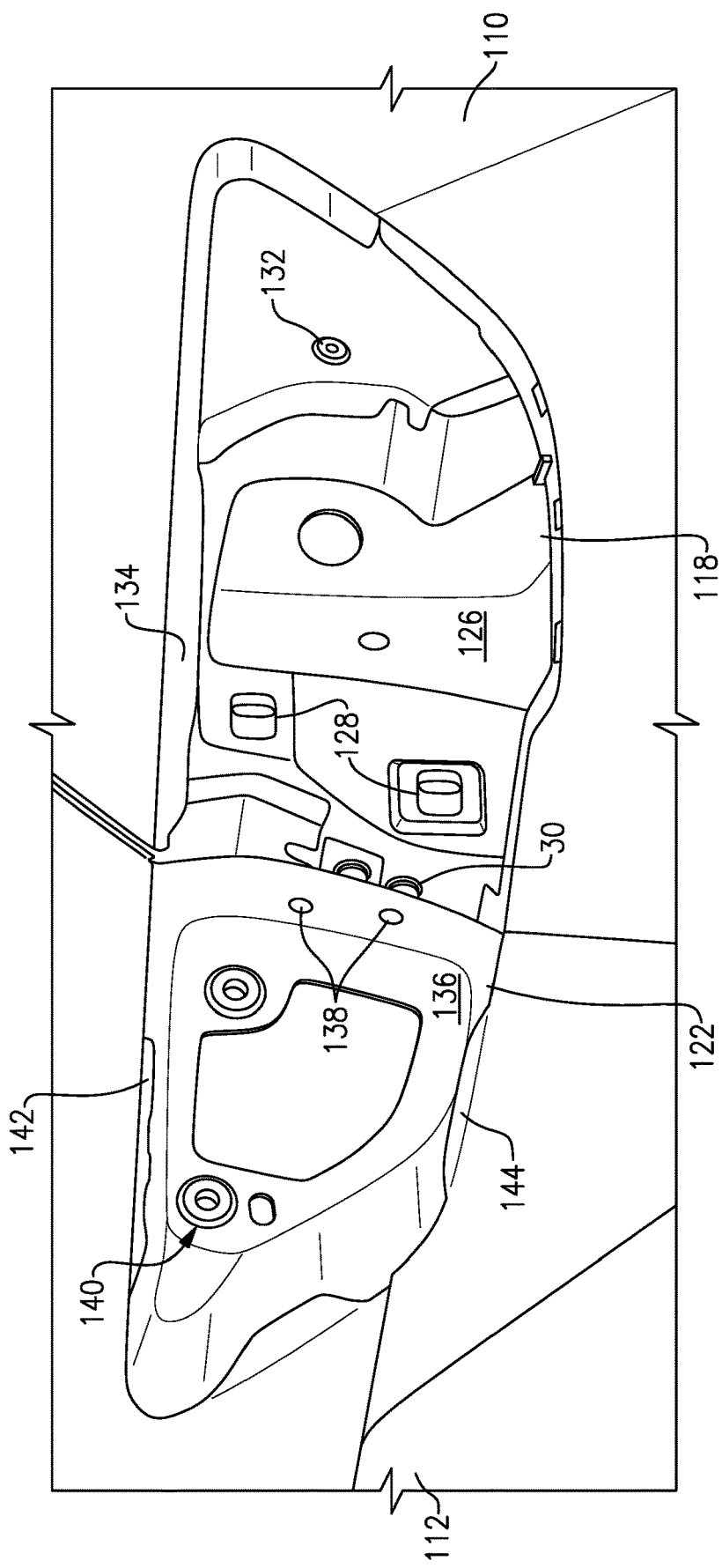
FIG. 7 illustrates a rear view of another example of a lift gate panel and a body side panel incorporating the subject invention.

Another example is shown in FIGS. 7-11B. Similar reference numbers will be used to describe features that are common between the two examples. As shown in FIG. 7, a first rigid sheet metal attachment structure 126 is positioned at least partially in a first opening 118 of a body side panel 110 and includes a plurality of alignment features that cooperate with corresponding features on the body side lamp 120. The first attachment structure 126 comprises an inner panel structure while the body side panel 110 comprises an outer panel structure. In one example, the first attachment structure 126 includes one or more floating grommets 128 that provide y-control and one or more cylindrical grommets 30 for permanent securement to provide x-control. There is also at least one cylindrical grommet 132 that provides six-way control, i.e. x-control, y-control, and z-control. At an upper edge of the first opening 118 is a body side return flange 134 formed in the outer sheet metal panel. This body side return flange 134 provides the z-control. A lift system 152 is associated with the cylindrical grommets 130.

A second rigid sheet metal attachment structure 136 is positioned at least partially in a second opening 122 of a lift gate panel 112 and includes a plurality of alignment features that cooperate with corresponding features on the lift gate lamp 124. The second attachment structure 136 comprises an inner panel structure while the lift gate panel 112 comprises an outer panel structure. In one example, the second attachment structure 136 includes one or more vertically extending slots 138 or stamped holes that provide x-control and y-control. There is also one or more slotted grommets 140 with vertically extending slots that provide x-control and y-control. At an upper edge of the second opening 122 is an upper lift gate return flange 142 formed in the outer sheet metal panel. At a lower edge of the second opening 122 is a lower lift gate return flange 142. The upper 142 and lower 144 lift gate return flanges provide the z-control.

Figure 8:
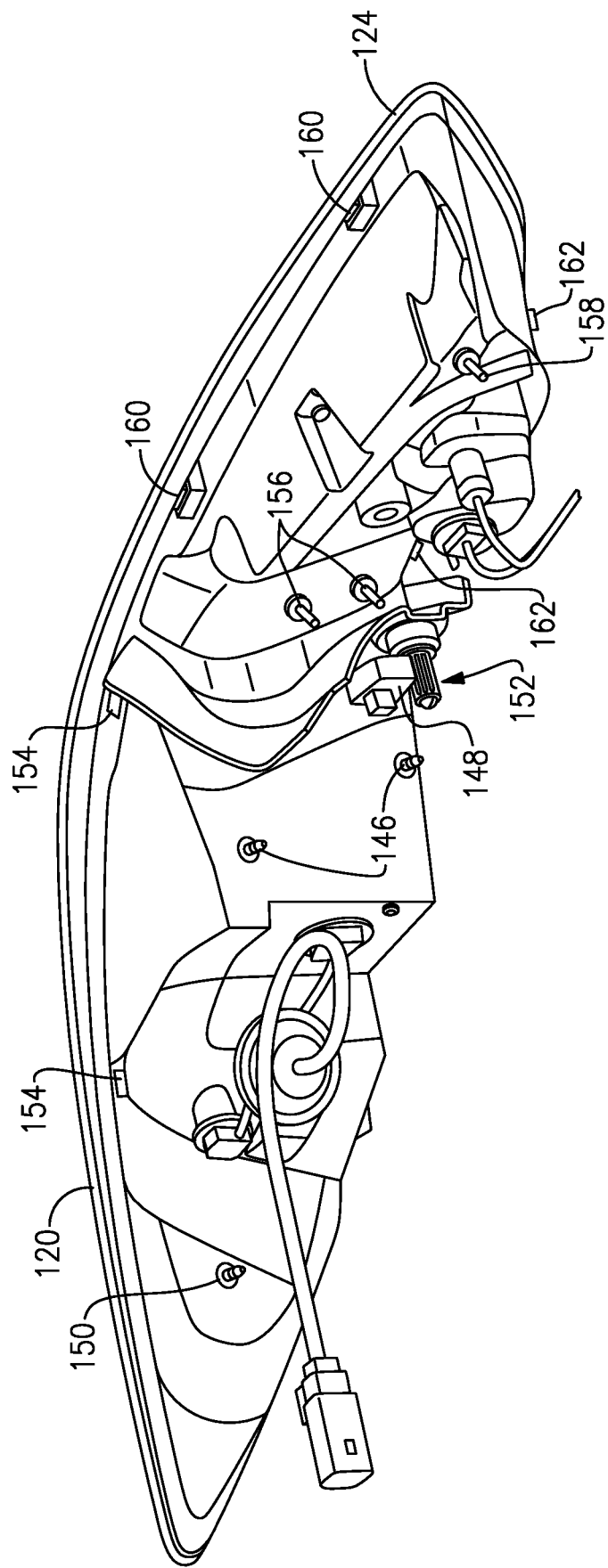
FIG. 8 illustrates an interior view of a lift gate lamp and a body side lamp to be attached to the respective panels of FIG. 7.

FIG. 8 shows an interior view of the body side 120 and lift gate 124 lamps with alignment features that cooperate with those of the body side panel 110 and lift gate panel 112 as shown in FIG. 7. The body side lamp 120 includes one or more cylindrical garyballs 146 that provide y-control and one or more cylindrical fasteners 148, such as screws for example, that are for permanent securement to provide x-control. There is also at least one cylindrical garyball 150 that provides six-way control, i.e. x-control, y-control, and z-control. A lift system 152 cooperates with the fastener 148 to adjust the vertical position of the body side lamp 120 to set a z-margin. At an upper edge of the body side lamp 120 is one or more net pads 154 that cooperate with the body side return flange 134 to set the z-margin and provide the z-control.

The lift gate lamp 124 includes one or more cylindrical threaded fasteners 156, such as threaded studs for example, that provide permanent attachment as well as x-control and y-control. There is also one or more garyballs 158 that provide x-control and y-control. At an upper edge of the lift gate lamp 124 is one or more net pads 160 that cooperate with the upper lift gate return flange 142 to set the z-margin and provide the z-control. An additional lift system 162 cooperates with the lower lift gate return flange 142 to provide z-control.

Figure 9:
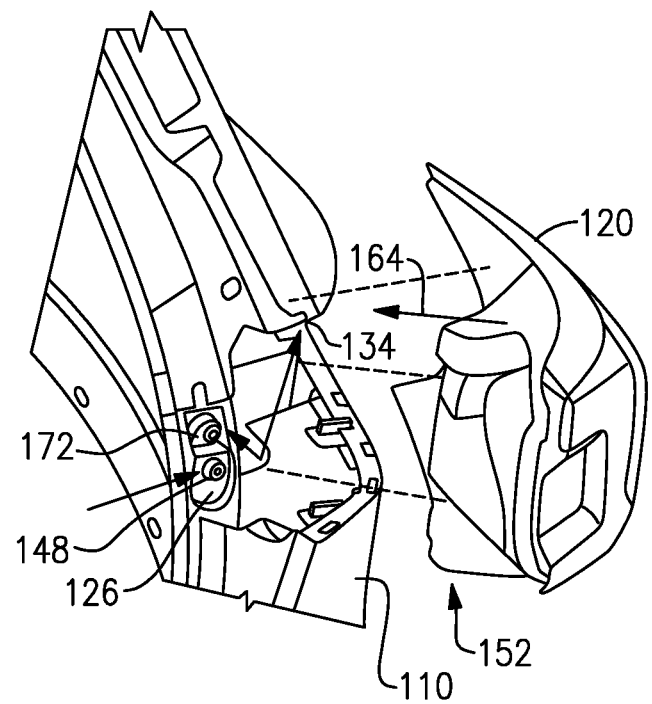
FIG. 9 is an installation view of the body side lamp of FIG. 8 being installed onto the body side panel.
Figure 10:
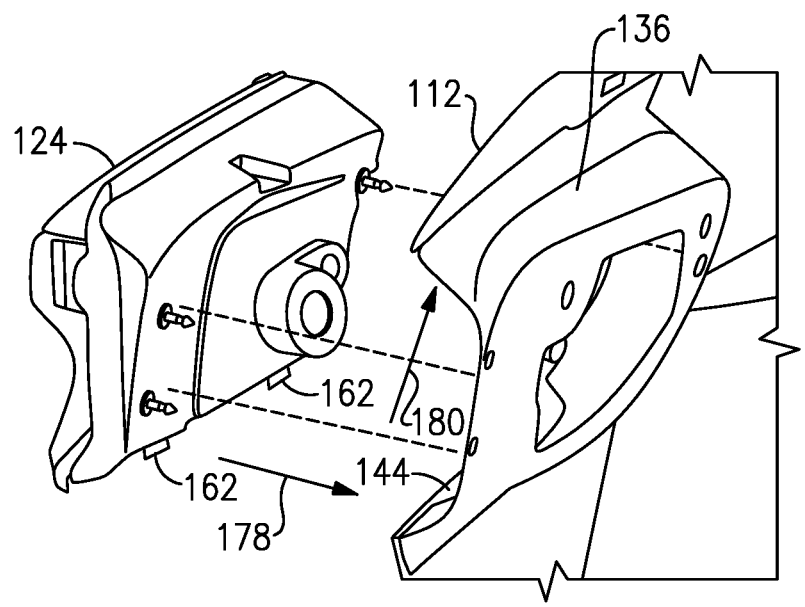
FIG. 10 is an installation view of the lift gate lamp of FIG. 8 being installed onto the lift gate panel.

FIG. 9 shows how the body side lamp 120 is secured to the body side panel 110 and FIG. 10 shows how the lift gate lamp 124 is secured to the lift gate panel 112. As shown in FIG. 9, the first step (indicated by arrow 164) includes installing the body side lamp 120 onto alignment and attachment features of the body side panel 110. For example, two cylindrical garyballs 146 are installed onto two floating grommets 128 and one cylindrical garyball 150 is installed onto one cylindrical grommet 132. The fastener 48 cooperates with the lift system 52 and two cylindrical grommets 130 to set the z-margin and then permanently secure the body side lamp 120 in place.

Figure 11A:
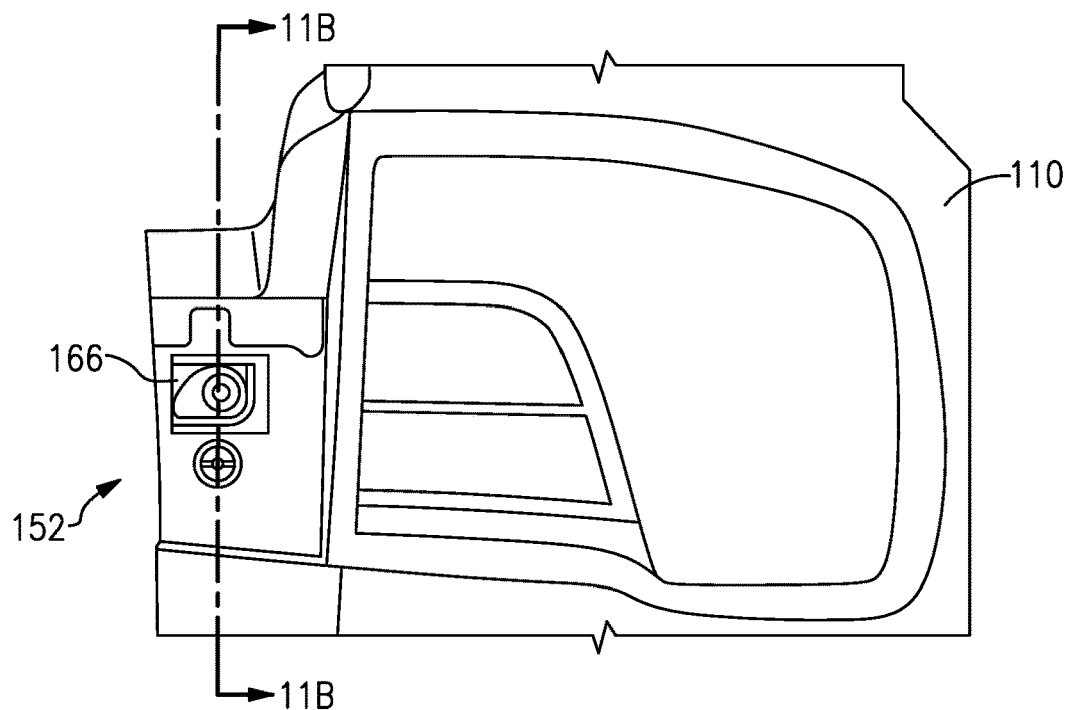
FIG. 11A is an end view from a rear of the vehicle showing the body side lamp and lift system of FIGS. 7-8.
Figure 11B:
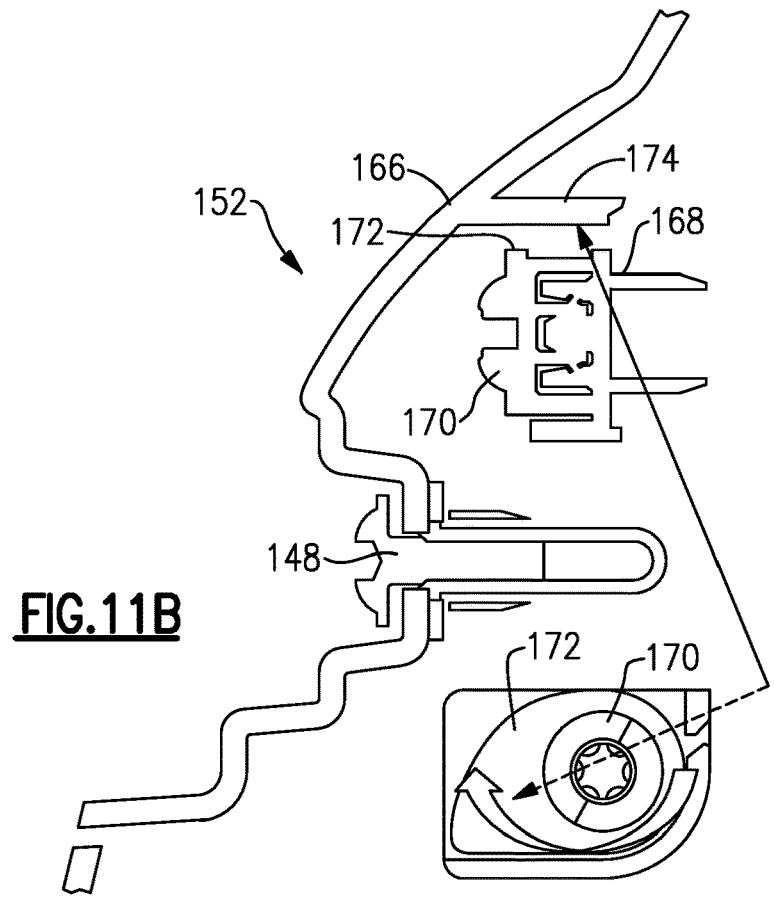
FIG. 11B is a section view of the lift system as identified in FIG. 11A.

Another example of a lift system 152 is shown in FIGS. 11A-11B. The lift system 152 includes a bracket body 166 that is mounted to the lift gate lamp 124. The bracket body 166 includes an opening 168 which receives a rotating member 170 with a teardrop shaped head 172. A wall portion 174 is formed as part of the bracket body 166 and is positioned in a vertical overlapping relationship to the teardrop shaped head 172 (FIG. 11B).

Once the body side lamp 120 is installed on the body side panel 120, the teardrop shape head 172 is rotated which causes the body side lamp 120 to move up until the head 172 catches the wall portion 174 and the net pads 154 of the body side lamp 120 engage or net out on the metal return flange 134 of the body side panel 110. When the pads 154 net out on the return flange 134 the z-margin is set and no further vertical adjustment of the body side lamp 120 is required. The installer then torques down the bottom fastener 148 to set the x-margin and the y-margin. The body side lamp 120 is then finally installed and secured to the body side panel 110.

As shown in FIG. 10, a first step (indicated by arrow 178) includes installing the lift gate lamp 124 onto alignment and attachment features of the lift gate panel 112. In one example, the lift gate lamp 124 is installed in a manner that is similar to that shown in FIG. 4. One the lift gate lamp 124 is in the correct vertical position, the threaded fasteners 156 are torqued down to set the x-margin and the y-margin. Once this occurs, the lift gate lamp 124 is fully installed and is aligned with the body side lamp 120. As shown in FIG. 6, the top edges of both lamps 120, 124 are aligned within each other.

The subject invention allows net pads on both the lift gate and body side lamps to always touch off on the outer panel return flange which is tightly controlled from a dimensional aspect. As both lamps are netting off on the same outer panel, this reduces any vertical variation that would be seen when you locate to inner panels, which always allows both lamps to remain at a constant margin across the top of the lamps. This provides a best fit and finish when a lift gate or trunk is closed and reveals that the alignment and margin at the top of the lamps match from lift gate lamp to body side lamp.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
a first panel with a first alignment feature;
a first lamp installed on the first panel;
a second panel adjacent the first panel and including a second alignment feature;
a second lamp installed on the second panel; and
a lift system to move the first and second lamps to respectively engage the first and second alignment features and align the first and second lamps.

2. The apparatus according to claim 1, wherein the second panel is moveable relative to the first panel.

3. The apparatus according to claim 2, wherein the first panel comprises a vehicle body side panel and the second panel comprises a lift gate or trunk.

4. The apparatus according to claim 3, wherein the lift system moves the first lamp independently of the second lamp.

5. The apparatus according to claim 2, wherein the first alignment feature comprises a first return flange formed at an upper edge of a first opening in the first panel, and wherein the second alignment feature comprises a second return flange formed at an upper edge of a second opening in the second panel, and wherein the first lamp includes at least one first net pad that engages the first return flange and the second lamp includes at least one second net pad that engages the second return flange such that the first and second lamps have top edges that are aligned with each other.

6. The apparatus according to claim 1, wherein the lift system includes a first lift mechanism to move the first lamp upwardly and a second lift mechanism to move the second lamp upwardly independently of the first lamp.

7. The apparatus according to claim 6, wherein the first lift system includes at least one rotatable member that is rotated to lift the first lamp into engagement with the first alignment feature and the second lift system includes at least one resilient member that biases the second lamp into engagement with the second alignment feature.

8. An apparatus, comprising:
a fixed body panel with a first return flange;

a moveably body panel adjacent the fixed body panel and including a second return flange;

first and second lamps respectively attached to the fixed and moveable body panels; and a lift system to independently move the first and second lamps upwardly to respectively engage the first and second return flanges and align the lamps with each other.

9. The apparatus according to claim 8, wherein the fixed body panel comprises a vehicle body side panel and the moveable body panel comprises a lift gate or trunk.

10. The apparatus according to claim 9, wherein the lift system includes at least one rotatable member that is rotated to lift the first lamp into engagement with the first return flange and at least one resilient member that biases the second lamp into engagement with the second return flange.

11. The apparatus according to claim 10, wherein the at least one rotatable member includes a first fastener that is rotated to adjust a vertical position of the first lamp and a second fastener that is tightened to fix the first lamp to the fixed body panel once the first lamp is in engagement with the first return flange, and wherein the at least one resilient member comprises at least one spring clip that is biased to adjust a vertical position of the second lamp.

12. A method comprising:

installing a first lamp on a body side panel having a first alignment feature;

installing a second lamp on a second panel moveable relative to the body side panel and including a second alignment feature; and aligning the first and second lamps with each other by independently moving the first and second lamps to respectively engage the first and second alignment features.

13. The method according to claim 12 including providing a first set of locators on the body side panel, installing the first lamp on the first set of locators, and adjusting a vertical position of the first lamp by lifting the first lamp into engagement with the first alignment feature.

14. The method according to claim 13 including providing a second set of locators on the second panel, installing the second lamp on the second set of locators, and adjusting a vertical position of the second lamp by lifting the second lamp into engagement with the second alignment feature.

15. The method according to claim 14 including independently fastening the first lamp to the body side panel and the second lamp to the second panel subsequent to the adjusting the vertical positions of the first and second lamps.

16. The method according to claim 14, wherein the second alignment feature comprises a second return flange, and including adjusting a vertical position of the second lamp by providing at least one resilient biasing member on a lower edge of the second lamp to bias the second lamp in vertically upward direction to set a vertical margin.

17. The method according to claim 16 including fastening the second lamp to the body side panel to set horizontal and longitudinal margins subsequent to setting the vertical margin.

18. The method according to claim 13, wherein the first alignment feature comprises a first return flange, and including adjusting a vertical position of the first lamp by rotating at least one rotatable member on the first lamp to raise the first lamp upwardly to set a vertical margin.

19. The method according to claim 18 including fastening the first lamp to the second panel to set horizontal and longitudinal margins subsequent to setting the vertical margin.

20. The method according to claim 12 wherein the first alignment feature comprises a first return flange formed at an upper edge of a first opening in the body side panel, and wherein the second alignment feature comprises a second return flange formed at an upper edge of a second opening in the second panel, and including providing the first lamp with at least one first net pad and the second lamp with at least one second net pad, raising the first lamp such that the first net pad engages the first return flange, and raising the second lamp such that the second net pad engages the second return flange resulting in first and second lamps that have upper edges that are aligned with each other.

* * * * *